(12) United States Patent
Chandra et al.

(10) Patent No.: US 8,699,424 B2
(45) Date of Patent: Apr. 15, 2014

(54) ADAPTING CHANNEL WIDTH FOR IMPROVING THE PERFORMANCE OF WIRELESS NETWORKS

(75) Inventors: Ranveer Chandra, Kirkland, WA (US); Ratul Mahajan, Seattle, WA (US); Thomas Moscibroda, Redmond, WA (US); Paramvir Bahl, Sammamish, WA (US); Ramya Raghavendra, Goleta, CA (US)

(73) Assignee: Microsoft Corporation, Redmond, WA (US)

( * ) Notice: Subject to any disclaimer, the term of this patent is extended or adjusted under 35 U.S.C. 154(b) by 771 days.

(21) Appl. No.: 12/163,187

(22) Filed: Jun. 27, 2008

(65) Prior Publication Data

US 2009/0323600 A1 Dec. 31, 2009

(51) Int. Cl.
  *H04W 4/00* (2009.01)
  *H04J 3/06* (2006.01)
  *H04J 3/16* (2006.01)

(52) U.S. Cl.
  USPC .......... 370/329; 370/328; 370/350; 370/437; 370/503; 370/516; 370/519

(58) Field of Classification Search
  USPC ................................. 370/329, 437
  See application file for complete search history.

(56) References Cited

U.S. PATENT DOCUMENTS

| 6,167,031 | A | 12/2000 | Olofsson et al. | |
|---|---|---|---|---|
| 6,298,035 | B1 * | 10/2001 | Heiskala | 370/206 |
| 6,351,499 | B1 | 2/2002 | Paulraj et al. | |
| 6,654,428 | B1 | 11/2003 | Bose et al. | |
| 6,665,311 | B2 | 12/2003 | Kondylis et al. | |
| 6,735,448 | B1 | 5/2004 | Krishnamurthy et al. | |
| 7,162,204 | B2 | 1/2007 | Hansen et al. | |
| 2002/0155811 | A1 | 10/2002 | Prismantas et al. | |
| 2004/0185887 | A1 * | 9/2004 | Wolman et al. | 455/516 |
| 2005/0232134 | A1 * | 10/2005 | van Nee | 370/206 |
| 2007/0002898 | A1 * | 1/2007 | Boariu et al. | 370/468 |
| 2007/0076649 | A1 | 4/2007 | Lin et al. | |
| 2008/0043668 | A1 * | 2/2008 | Chen et al. | 370/329 |
| 2008/0175421 | A1 * | 7/2008 | Chizari | 381/315 |
| 2009/0069057 | A1 * | 3/2009 | Haartsen et al. | 455/574 |

FOREIGN PATENT DOCUMENTS

WO   WO9901945 A1   1/1999

OTHER PUBLICATIONS

Shah, et al. Dynamic Bandwidth Management in Single-Hop Ad Hoc Wireless Networks. In: Mobile Networks and Applications. Feb. 2006, vol. 10, pp. 199-217 http://delivery.acm.org/10.1145/1050000/1046445/p199-shah.pdf?key1=1046445&key2=3725559021&coll=GUIDE&dl=GUIDE&CFID=26031883&CFTOKEN=26133946. Last accessed May 1, 2008, 19 pages.

(Continued)

*Primary Examiner* — Faruk Hamza
*Assistant Examiner* — Diane Lo
(74) *Attorney, Agent, or Firm* — Stephen A. Wight; Carole Boelitz; Micky Minhas

(57) ABSTRACT

The subject invention relates to a system and/or methodology that provide improved wireless networking performance by dynamically adapting the channel width. A dynamic adaptation component adjust the channel width based on at least one characteristic of a wireless network, the characteristics can include but are not limited to range, power consumption, throughput, signal to noise ratio (SNR), resilience to delay spread, data rate, and capacity. Additionally, an optimization component can determine an optimum channel width.

22 Claims, 13 Drawing Sheets

(56) References Cited

OTHER PUBLICATIONS

Elbatt, et al. Power Management for Throughput Enhancement in Wireless Ad-Hoc Networks http://www.cs.ucr.edu/~krish/icc1hrl.pdf. Last accessed May 1, 2008, 9 pages.

Holland, et al. A Rate-Adaptive MAC Protocol for Multi-Hop Wireless Networks—In: IEEE Int. Conf. on Mobile Computing and Networking (MOBICOM'01), Rome, Italy, Jul. 2001. Last accessed May 1, 2008, 15 pages.

Yuan, et al. Allocating Dynamic Time-Spectrum Blocks in Cogintive Radio Networks. In: MobiHoc'07, Sep. 9-13, 2007, Montreal, Quebec, Canada. ACM 978-1-59593-684-4/07/0009. Last accessed May 1, 2008, 10 pages.

Kotz. Analysis of a Campus-wide Wireless Network. In Proceedings of the Eighth Annual International Conference on Mobile Computing and Networking, pp. 107-118, (MOBICOM'02, Sep. 23-26, 2002, Atlanta, Georgia, USA). Revised and corrected as Dartmouth CS Technical Report TR2002-432. http://www.cs.dartmouth.edu/~dfk/papers/kotz-campus.pdf. Last accessed May 1, 2008, 12 pages.

Tang, et al. Analysis of a Local-Area Wireless Network. Last accessed May 1, 2008, 11 pages.

802.11a/g: The clear solution for maximizing WLAN bandwidth. Last accessed May 1, 2008, 1 page.

Trachewsky, et al. Broadcom WLAN Chipset for 802.11a/b/g, Aug. 17, 2003. Last accessed May 1, 2008, 42 pages.

Bahl, et al. Cell Breathing in Wireless LANs: Algorithms and Evaluation. Last accessed May 1, 2008, 16 pages.

Balazinska, et al. Characterizing Mobility and Network Usage in a CorporateWireless Local-Area Network. Last accessed May 1, 2008, 14 pages.

Mishra, et al. MobiCom Poster Abstract : Client-driven Channel Management for Wireless LANs. Mobile Computing and Communications Review, vol. 10, No. 4. Last accessed May 1, 2008, 3 pages.

Ogilvie. Clock Solutions for Wi-Fi (IEEE 802.11). Last accessed May 1, 2008, 4 pages.

Govil, et al. Comparing Algorithms for Dynamic Speed-Setting of a Low-Power CPU. TR-95-017, International Computer Science Institute, Apr. 1995. Last accessed May 1, 2008, 13 pages.

Geier. Enabling Fast Wireless Networks with OFDM. CommsDesign, Feb. 1, 2001. Last accessed May 1, 2008, 6 pages.

Bejerano, et al. Fairness and Load Balancing in Wireless LANs Using Association Control. MobiCom'04, Sep. 26-Oct. 1, 2004, Philadelphia, Pennsylvania, USA. ACM 1-58113-868-7/04/0009. Last accessed May 1, 2008, 15 pages.

Bruno. High Speed Wireless LANs: The Impact of Atheros Super G Propreitary Performance Mode on 802.11g Devices, White Paper, Aug. 2004. Last accessed May 1, 2008, 11 pages.

Lacage, et al. IEEE 802.11 Rate Adaptation: A Practical Approach. MSWiM'04, Oct. 4-6, 2004, Venezia, Italy. ACM 1-58113-953-5/04/0010. Last accessed May 1, 2008, 9 pages.

Delay Spread, JPL's Wireless Communication Reference Website. Last accessed May 1, 2008, 4 pages.

Aguayo, et al. Link-level Measurements from an 802.11b Mesh Network. SIGCOMM'04, Aug. 30-Sep. 3, 2004, Portland, Oregon, USA. ACM 1-58113-862-8/04/0008. Last accessed May 1, 2008, 11 pages.

Camp, et al. Measurement Driven Deployment of a Two-Tier Urban Mesh Access Network. MobiSys'06, Jun. 19-22, 2006, Uppsala, Sweden. ACM 1-59593-195-3/06/0006. Last accessed May 1, 2008, 14 pages.

Wormsbecker, et al. On Channel Selection Strategies for Multi-Channel MAC Protocols in Wireless Ad Hoc Networks. 1-4244-0495-9/06 IEEE. Last accessed May 1, 2008, 9 pages.

Heusse, et al. Performance Anomaly of 802.11b. In: INFOCOM 2003, 0-7803-7753-2/03 IEEE. Last accessed May 1, 2008, 8 pages.

Weiser, et al. Scheduling for Reduced CPU Energy. In: "Proceedings of the First Symposium on Operating Systems Design and Implementation," Usenix Association, Nov. 1994. Last accessed May 1, 2008, 11 pages.

Gummadi, et al. Understanding and Mitigating the Impact of RF Interference on 802.11 Networks. Last accessed May 1, 2008, 14 pages.

Judd, et al. Using Emulation to Understand and Improve Wireless Networks and Applications. Last accessed May 1, 2008, 14 pages.

WiMAX Forum. Last accessed May 1, 2008, 2 pages.

Part 11: Wireless LAN Medium Access Control (MAC) and Physical Layer (PHY) Specifications. ANSI/IEEE Std 802.11, 1999 Edition. Last accessed May 1, 2008, 528 pages.

* cited by examiner

ADAPTING CHANNEL WIDTH FOR IMPROVING THE PERFORMANCE OF WIRELESS NETWORKS

BACKGROUND OF THE INVENTION

Wireless networking is currently among the most rapidly expanding sectors of telecommunications and computer technology. Modern wireless networking offers excellent connectivity, convenience, and the reliability that consumers have come to expect from their everyday devices. Everything from cars to personal audio devices contains the ability to communicate wirelessly with other devices. However, the static allocation of preset channel widths employed in many wireless networks has a variety of undesirable limitations.

Currently, a great deal of wireless communication today involves the use of channels with preset widths. A wireless channel is the frequency spectrum block over which nodes transmit; it is uniquely specified by its center frequency and channel width (expressed in Hertz). The use of preset channel widths is a direct result of how the available spectrum is divided by existing wireless technologies. For example, in 802.11 (Wi-Fi) b/g, the total available spectrum block is divided into 11 overlapping channels that have a channel width of 20 MHz each and the center frequencies are separated by 5 MHz. At any given time, a Wi-Fi node communicates over one of these channels. In some cases, such as WiMax, the spectrum block is divided into channels having different widths. Yet, even in systems such as WiMax the channel width is statically assigned.

The use of preset channel widths can be highly inefficient. Additionally, fixed channel width systems must balance increasing range and reducing power consumption. The range can be increased by increasing transmission power or using lower modulation. Using lower modulations does not change the instantaneous power, but increasing transmission power increases power consumption. Moreover, the transmission range of fixed channel width systems is inherently limited, because the FCC limits the total transmission power of Wi-Fi radios. Consequently, a substantial need exists for a system that provides for adaptive control of channel widths for improved wireless networking.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The claimed subject matter relates to adapting channel width for improving the performance of wireless networks. In accordance with various aspects of the claimed subject matter, an analysis component determines one or more network performance factors. The network performance factors can include but are not limited to power consumption, signal to noise ratio (SNR), data rate, loss rate, and link condition. The network performance data is communicated to a control component. The control component obtains one or more optimization objectives from external entities, such as users, higher-layer protocols, or associated applications. The control component can generate control data based on the optimization objectives and/or network performance data. The desired objectives can include throughput, transmission range, capacity, and power consumption.

The network performance data and control data are communicated to a dynamic adaptation component. The dynamic adaptation component adjusts the channel width of a wireless transmitter based at least in part on the network performance data and/or control data. For example, the dynamic adaptation component can obtain control data indicating that the network throughput should be increased by an amount T, and the dynamic adaptation component can determine the channel width necessary to increase the throughput by T. The dynamic adaptation component varies the channel width by adjusting the frequency of a reference clock that drives the wireless transmitter. Additionally, the dynamic adaptation component can include an optimization component that determines the optimum channel width based at least in part on the network performance data.

To the accomplishment of the foregoing and related ends, certain illustrative aspects of the invention are described herein in connection with the following description and the annexed drawings. These aspects are indicative, however, of but a few of the various ways in which the principles of the invention can be employed and the subject invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
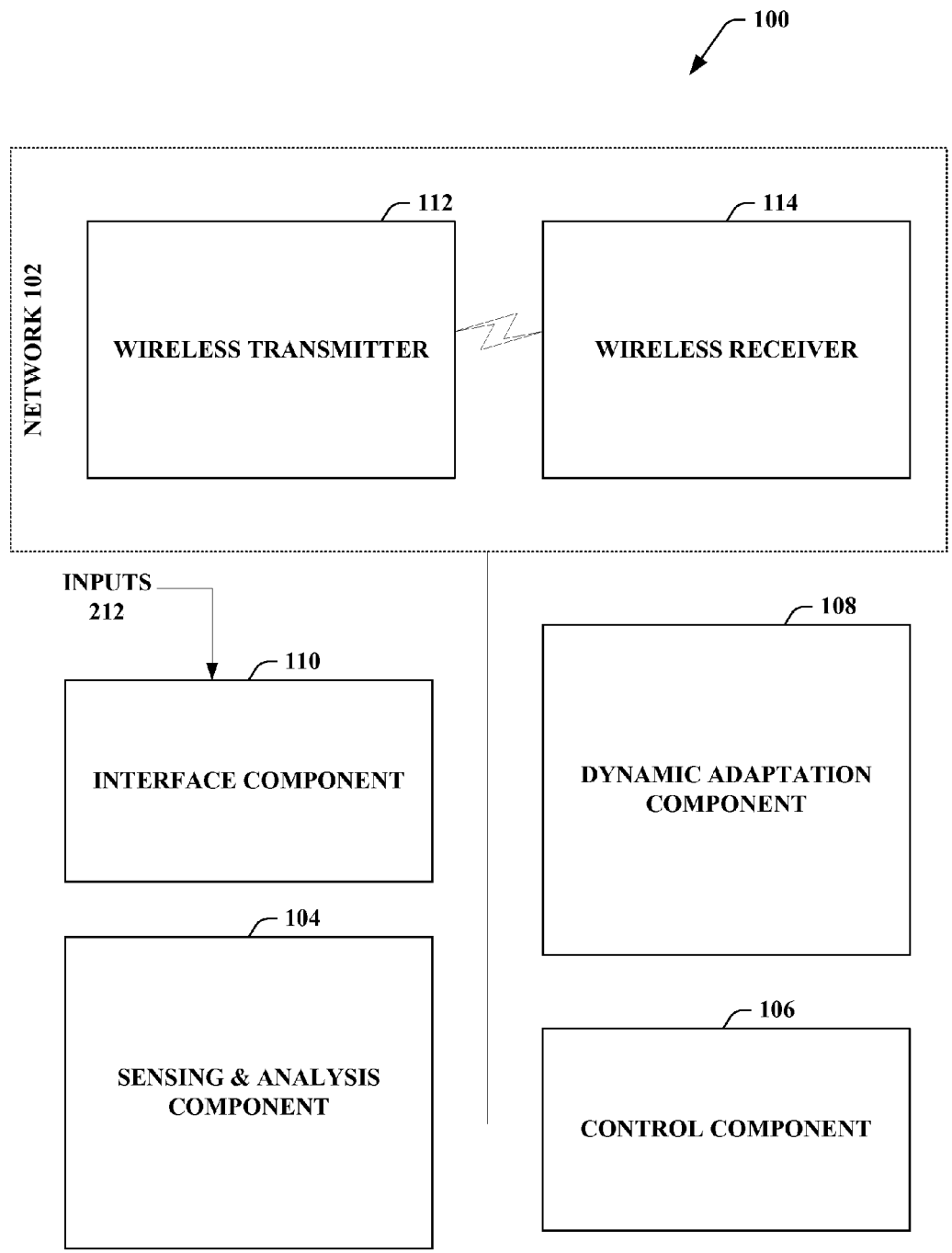
FIG. 1 is a general component block diagram illustrating a system for adapting channel width in wireless networking in accordance with an aspect of the present invention.

The subject invention relates to a system and/or methodology that provide improved wireless networking performance by dynamically adapting the channel width. In other words, a system and/or methodology that dynamically adjusts the channel width over which a signal is transmitted. The channel width adjustments can be based in part on criteria specified by users, higher-layer software protocols, or applications; and sensed and analyzed network and link condition data. In particular, a dynamic adaptation component adjusts the channel width based on at least one characteristic of a wireless network. The characteristics can include but are not limited to range, power consumption, throughput, signal to noise ratio (SNR), resilience to delay spread, data rate, loss rate, and capacity. Additionally, an optimization component can determine the optimum channel width.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component," "system," "object," "model," "policy," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Referring initially to FIG. 1, an adaptive channel width system 100 is illustrated in accordance with an aspect of the subject invention. The system 100 includes a network 102, a sensing and analysis component 104, a control component 106, a dynamic adaptation component 108, and an interface component 110. The network 102 includes one or more wireless transmitters 112, and one or more wireless receivers 114. It is to be appreciated that the network 102 can include single or multiple wireless links between devices, such as the wireless transmitter 112 and the wireless receiver 114. For simplicity of explanation, the network 102 is described as having two nodes (a wireless transmitter 112 and a wireless receiver 114). However, it is to be appreciated that the network 102 can include a plurality of nodes. Additionally, the wireless transmitter 112 and/or wireless receiver 114 can be wireless transceivers or wireless transmitter-receivers, and operate as both a transmitter and receiver. The wireless transmitter 112 transmits data using a channel having a specified width, referred to as channel width. The channel width is the width of the spectrum over which the wireless transmitter 112 transmits its signals.

The sensing and analysis component 104 observes various network 102 performance factors (e.g. network performance data). The network performance data can include but is not limited to, energy consumption, data rate, loss rate, interference, link condition, signal-to-noise ratio (SNR), and signal strength. The sensing and analysis component 104 can acquire the network performance data via a plurality of methods, including but not limited to communication with measurement devices associated with the network 102, loading predetermined operational values (e.g. data tables, drivers, etc.), or obtaining the data from the network devices (e.g. wireless transmitters 112 or wireless receivers 114). For example, the sensing and analysis component 104 can determine the power consumed by the wireless transmitter 112 based on predetermined values for a given set of operational data (e.g. channel width, data rate, etc.).

The network performance data is communicated to the control component 106. The control component 106 obtains optimization objectives from predetermined policies or external entities, such as users, higher-layer protocols, or associated applications. The optimization objectives can include objectives such as optimizing the network 102 for a desired throughput, range, capacity, power consumption, etc. The control component 106 can generate control data based at least in part on the network performance data and the optimization objectives. For example, an associated application can communicate a desire to optimize the wireless transmitter 112 for minimum power consumption, and the network performance data can include data regarding the estimated or predetermined current power consumption of the wireless transmitter 112. The control component 106 can generate control data, such as desired power consumption for the wireless transmitter 112 based on the optimization objectives and/or network performance data.

The network performance data and the control data are communicated to the dynamic adaptation component 108. The dynamic adaptation component 108 dynamically adjusts the channel width of the wireless transmitter 112 based at least in part on the network performance data and/or the control data. For example, the dynamic adaptation component 108 can obtain control data from the control component 106 indicating that increasing the network throughput by an amount T would be desirable. The dynamic adaptation component 108 can determine the channel width necessary to increase the throughput by T based at least in part on the network performance data.

Throughput is a measure of the data bytes transmitted per second from the wireless transmitter 112 to the wireless receiver 114. Typically, throughput is measured in megabytes per second (Mbps). According to Shannon's capacity formula, the theoretical capacity of a communication channel is proportional to the channel width. Consequently, in theory increasing the channel width by a factor of two should also increase the throughput by a factor of approximately two. For example, if the throughput is 4 Mbps using a 5 MHz channel, then the throughput should be approximately 8 Mbps using a 10 MHz channel. However, in real world operation the capacity of a communication channel is not exactly proportional to the channel width, due in part to communication overheads (e.g. inter-frame spacings, etc.) The channel width required to achieve a desired result (e.g. throughput, range, power consumption) is communicated to the network 102, and the wireless transmitter 112 sends the data using the specified width for the channel.

Additionally or alternatively, adapting channel width can increase the capacity of the network 102. For instance, the network 102 can have X flows sharing a 40 MHz channel, wherein X is an integer (e.g. 2). The system 100 can increase the capacity by partitioning the conversations that share the 40 MHz channel into multiple narrower channels, such as a plurality of channels having 40/X MHz (e.g. 20 MHz where X equals 2). Separating the flows on different channels can allow faster flows to transmit faster, thus increasing the capacity. In addition, gains in capacity can result from reduced contention overhead, and the fact that narrower channels have a smaller per-packet relative overhead.

The system 100 further includes an interface component 110, which provides various adapters, connectors, channels, communication paths, etc. to integrate the sensing and analysis component 104, the control component 106, and/or the dynamic adaptation component 108 into virtually any operating and/or database system(s). In addition, the interface component 110 can provide various adapters, connectors, channels, communication paths, etc., that provide for interaction with the sensing and analysis component 104, the control component 106, the dynamic adaptation component 108, and the network 102. It is to be appreciated that although the interface component 110 is illustrated as a stand-alone component to receive or transmit data in relation to the system 100, such implementation is not so limited. For instance, the interface component 110 can be integrated into the sensing and analysis component 104, the control component 106, and/or the dynamic adaptation component 108. In particular, the interface component 110 can receive any data relating to a device that is associated with the system 100. For instance, the interface component 106 can receive raw collected data, a set of network process related data, or data from associated external entities, such as users, associated applications, or higher-layer protocols.

Figure 2:
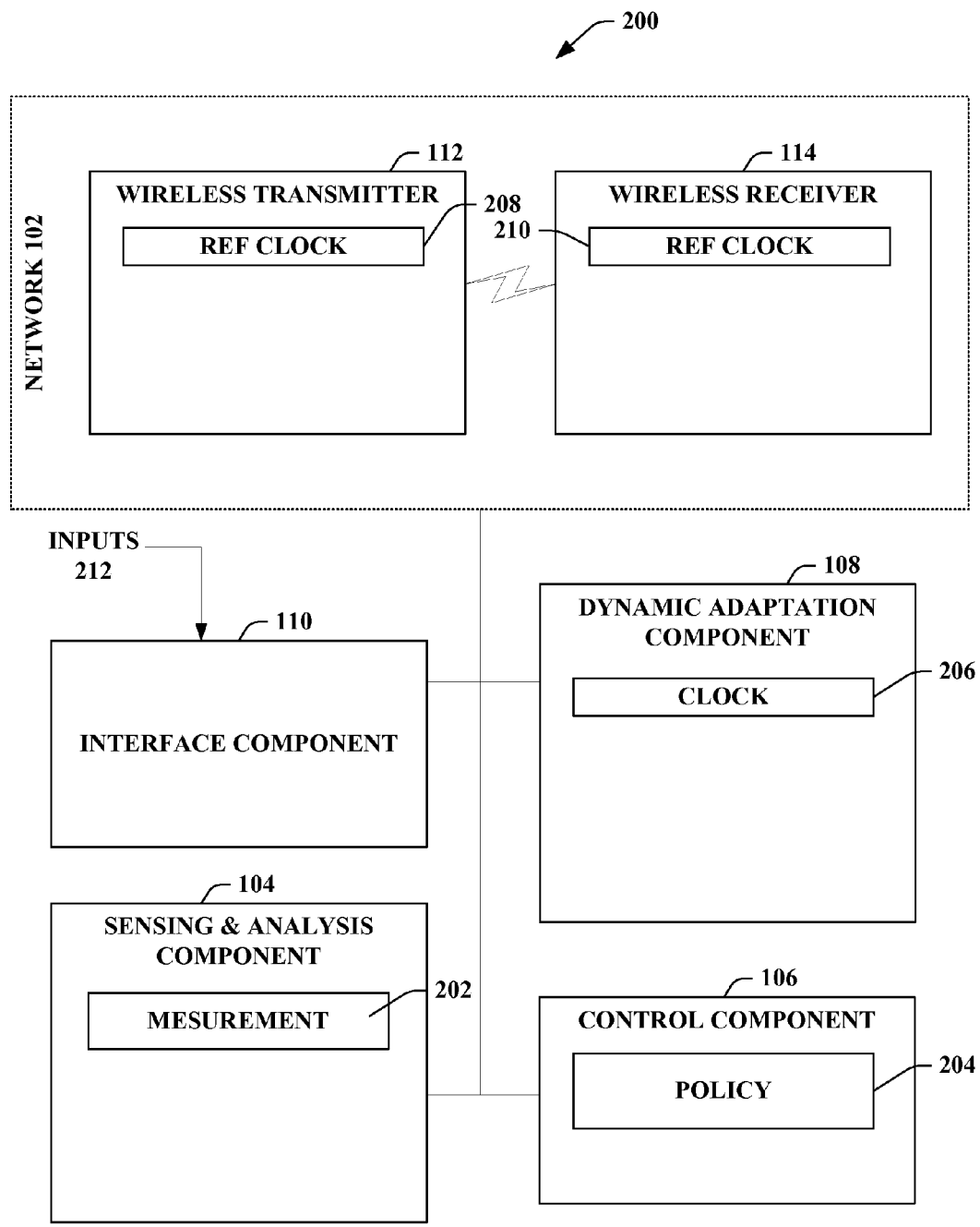
FIG. 2 is a general component block diagram illustrating a system for adapting channel width in wireless networking in accordance with an aspect of the present invention.

Referring to FIG. 2, an adaptive channel width system 200 is illustrated in accordance with an aspect of the subject invention. The system 200 includes a network 102, a sensing and analysis component 104, a control component 106, a dynamic adaptation component 108, and an interface component 110. As noted supra, the network 102 includes one or more wireless transmitters 112 and one or more wireless receivers 114. It is to be appreciated that the network 102 can include single or multiple wireless links between two devices, such as the wireless transmitter 112 and the wireless receiver 114. For simplicity of explanation, the network 102 is described as having only two nodes (a wireless transmitter 112 and a wireless receiver 114). However, it is to be appreciated that the network can contain any number of nodes. Moreover, the wireless transmitter 112 and/or wireless receiver 114 can be wireless transceivers or wireless transmitter-receivers, and operate as both a transmitter and receiver. The wireless transmitter 112 sends data using a channel of a specified width (e.g. channel width) to the wireless receiver 114. The wireless transmitter 112 and wireless receiver 114 include reference clocks 208 and 210, respectively. The frequency of the reference clocks 208 and 210 determines the channel width (discussed infra). As previously discussed, the channel width is the width of the wireless spectrum over which the wireless transmitter 112 transmits its signals, and the wireless receiver 114 receives the signals.

The sensing and analysis component 104 includes a measurement component 202. The measurement component 202 examines one or more network performance factors, including but not limited to energy consumption, data rate, loss rate, interference, link condition, signal-to-noise ratio (SNR), and signal strength. The measurement component 202 can acquire the network performance data via a plurality of methods, including but not limited to communication with measurement devices associated with the network 102, loading predetermined operational values (e.g. data tables, drivers, etc.), or obtaining the data from the network devices (e.g. wireless transmitters 112 or wireless receivers 114).

Subsequently, the sensing and analysis component 104 can format, packetize, or otherwise prepare the network performance factors as network performance data for use by the system 200 or an external entity. For example, the measurement component 202 can collect raw energy consumption data from the wireless transmitter 112, and format the raw data for use by the control component 106 or dynamic adaptation component 108.

The network performance data is communicated to the control component 106. The control component 106 includes a policy component 204, and can obtain optimization objectives from an external entity, such as a user, a higher-layer protocol, or an application. The optimization objectives can include objectives such as optimizing the system 200 for a desired throughput, range, capacity, power consumption, etc.

The policy component 204 generates one or more policies for controlling the channel width of the system 200. The policies can be determined by the external entities or inferred by the policy component 204. For example, an associated application can set a policy for power consumption based on the time of day, wherein power consumption is optimized for peak and low traffic time intervals. The control component 106 can generate a set of control data, such as a desired power consumption for the wireless transmitter 112, based at least in part on one or more of the policies, optimization objectives, and the network performance data.

As previously noted, the network performance data and control data are communicated to the dynamic adaptation component 108. The dynamic adaptation component 108 dynamically adjusts the channel width of the wireless transmitter 112 based at least in part on the control data and/or the network performance data.

The dynamic adaptation component 108 includes a clock component 206. The clock component 206 can adjust the reference clocks 208 and 210 in the wireless transmitter 112 and wireless receiver 114, respectively, to achieve a desired channel width. The frequency of the reference clocks 208 and 210 determines the channel width of the wireless transmitter 112 and wireless receiver 114. Subsequently, the wireless transmitter 112 transmits signals to the wireless receiver 114 at the set channel width.

As noted previously, the system 200 further includes an interface component 110, which provides various adapters, connectors, channels, communication paths, etc. to integrate the sensing and analysis component 104, the control component 106, and/or the dynamic adaptation component 108 into virtually any operating and/or database system(s). In addition, the interface component 110 can provide various adapters, connectors, channels, communication paths, etc., that provide for interaction with the sensing and analysis component 104, the control component 106, the dynamic adaptation component 108, and the network 102. Moreover, the interface component 110 can obtain data via a set of inputs 212. The inputs 212 can include explicit user inputs (e.g., configuration selections, question/answer) such as from mouse selections, keyboard selections, speech, and so forth. Additionally, the inputs 212 can receive data transfers from a user, a third party source (e.g. computer or a computer readable medium), or associated application/system to the system 200.

It is to be appreciated that although the interface component 110 is illustrated as a stand-alone component to receive or transmit data in relation to the system 200, such implementation is not so limited. For instance, the interface component 110 can be integrated into the sensing and analysis component 104, the control component 106, and/or the dynamic adaptation component 108. In particular, the interface component 110 can receive any data relating to a device that is associated with a network process in the network 102. For instance, the interface component 106 can receive raw collected data, a network process related data, or data from associated external entities, such as users, associated applications, or higher-layer protocols.

Figure 3:
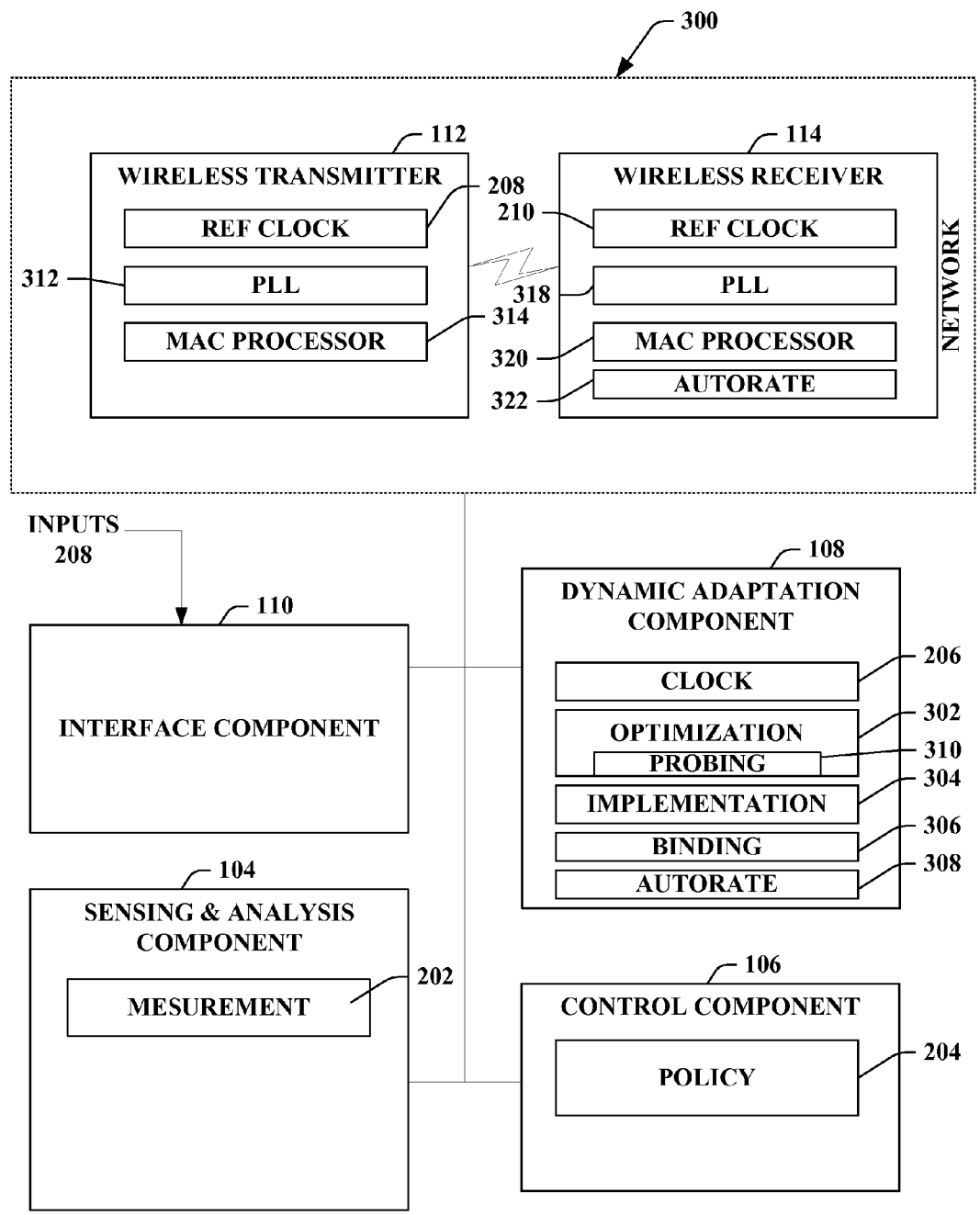
FIG. 3 is a general component block diagram illustrating a system for adapting channel width in wireless networking in accordance with an aspect of the present invention.

Referring to FIG. 3, an adaptive channel width system 300 is illustrated in accordance with an aspect of the subject invention. The system 300 includes a network 102, a sensing and analysis component 104, a control component 106, a dynamic adaptation component 108, and an interface component 110. As previously discussed, the network 102 includes one or more wireless transmitters 112 and one or more wireless receivers 114. It is to be appreciated that the network 102 can include single or multiple wireless links between two devices, such as the wireless transmitter 112 and the wireless receiver 114. For simplicity of explanation, the network 102 is described as having two nodes (e.g. a wireless transmitter 112 and a wireless receiver 114). However, it is to be appreciated that the network can include any combination of nodes. Additionally, the wireless transmitter 112 and/or wireless receiver 114 can be wireless transceivers or wireless transmitter-receivers, and operate as a transmitter and/or receiver. Furthermore, the system 300 can be implemented in a network 102 employing the IEEE 802.11 set of standards for wireless computer communication.

As previously discussed, the sensing and analysis component 104 includes a measurement component 202. The measurement component 202 observes one or more network performance factors, including but not limited to energy consumption, data rate, loss rate, interference, link condition, signal-to-noise ratio (SNR), and signal strength. The measurement component 202 can obtain the network performance data via the interface component 110 using a plurality of modes (discussed supra). Subsequently, the sensing and analysis component 104 can format, packetize, or otherwise prepare the network performance factors as network performance data for use by the system 300 or an external entity.

The network performance data is communicated to the control component 106. The control component 106 includes a policy component 204, and can obtain optimization objectives from an external entity, such as a user, a higher-layer protocol, or an application. The optimization objectives can include objectives such as optimizing the system 200 for a desired throughput, range, power consumption, etc.

The policy component 204 generates one or more policies for controlling the channel width of the system 200. The policies can be determined by the external entities or inferred by the policy component 204. The control component 106 can generate a set of control data, such as a desired power consumption for the wireless transmitter 112, based at least in part on one or more of the policies, optimization objectives, and/or the network performance data.

The network performance data and control data are communicated to the dynamic adaptation component 108. The dynamic adaptation component 108 dynamically adjusts the channel width of the wireless transmitter 112 based at least in part on the control data and/or the network performance data.

For example, the dynamic adaptation component 108 can obtain control data from the control component 106 directing the dynamic adaptation component 108 to increase network throughput by an amount T would, and the dynamic adaptation component 108 can determine the channel width necessary to increase the throughput by T based at least in part on the network performance data and control data.

The dynamic adaptation component 108 includes a clock component 206, an optimization component 302, an implementation component 304, and a binding component 306. The dynamic adaptation component 108 dynamically adjusts the channel width of the wireless transmitter 112 and wireless transmitter 114 based at least in part on the control data and/or the network performance data.

The optimization component 302 determines an optimum channel width for the wireless transmitter 112 based at least in part on the network performance data and/or control data. If there is no data to send then the narrowest channel width is the optimum channel width, which minimizes power usage and increases range. The transmission range is the distance at which a wireless receiver 114 can successfully decode a packet sent by the wireless transmitter 112. Narrower channel widths have increased range compared to wider channel widths primarily for two reasons: improved signal-to-noise ratio (SNR), and increased resilience to delay spread. For simplicity of explanation, the optimum channel width is discussed as the channel on which there is greatest throughput. However, it is to be appreciated that the optimum channel width can be determined as a function of the network performance data and/or control data. For example, the optimum channel width could be the channel width necessary to achieve a desired power consumption, transmission range, network capacity, etc. as determined by the control component 106.

The optimization component 302 includes a probing component 310. The probing component 310 can store the average throughput $T_i$ and the average data rate $R_i$ for each channel width $B_i$ generated by an auto-rate component 308 included in the wireless transmitter 112. The auto-rate component 308 can use any existing or future auto-rate algorithm to maximize the data rate over the variable physical channel. Auto-rate algorithms, and variations thereof, are well known in the art. Additionally, the probing component 310 can initiate a probing interval in which the average throughput $T_{avg}$, and the average data rate $R_{avg}$ for the current channel width $B_{cur}$ are determined. The probing component 310 can also store the average throughput $T_{avg}$, and the average data rate $R_{avg}$ for the current channel width $B_{cur}$.

To prevent oscillation, the probing component 310 does not probe a channel width if it was recently probed within a predetermined number of probing intervals X, where X is an integer. For example, the probing component 310 will not probe the channel width if it was probed within the last 5 probing intervals, where X equals 5.

The optimization component 302 determines if the current data rate $R_{avg}$ is below a predetermined threshold $\alpha$. The threshold $\alpha$ is based at least in part on three objectives: avoid disconnections, avoid unnecessary probing, and probing channels sufficiently often in order to avoid getting stuck on a suboptimal channel width. For example, avoiding disconnections can be satisfied by a range of values for $\alpha$. While, avoiding unnecessary probing requires a low value of $\alpha$, and the third objective requires that the first and second objective are not too strict (e.g. not too low for $\alpha$). If the current data rate $R_{avg}$ is below the predetermined threshold $\alpha$, and the channel width has not been probed within the predetermined number of probing intervals X, then the optimization component 302 selects the adjacent narrower channel width as the optimum channel width.

If the current average data rate $R_{avg}$ is not below a predetermined threshold α, then the optimization component 302 determines if the current data rate $R_{avg}$ is above a predetermined threshold β. The threshold β can be determined based at least in part on the same three objectives: avoid disconnections, avoid unnecessary probing, and probing channels sufficiently often in order to avoid getting stuck on a suboptimal channel width. The first and second objectives require a high value for β. The third objective requires that the first and second objectives are not too strict (e.g. not too high for β). If the current data rate $R_{avg}$ is above a predetermined threshold β, and the channel width has not been probed within the predetermined number of probing intervals X, then the optimization component 302 selects the adjacent wider channel width as the optimum channel width.

The optimization component 302 can determine the optimal values for α and β by computing the long term average throughput $T_{sw}(α,β)$ achieved when starting with an arbitrary channel width. Next, the optimization component 302 determines the average throughput $T_{opt}$ achieved by a hypothetical optimal algorithm that constantly transmits using the best possible channel width. Then, the optimization component 302 determines the efficiency $E_{sw}(α,β)$ of the parameter pair (α,β) as the ratio between the long term average throughput$_{Tsw}$ and the hypothetical optimal average throughput $T_{opt}$. For each parameter pair (α, β) the efficiency $E_{sw}(α,β)$ can be determined using the equation:

$$E_{sw}(α,β)=T_{sw}(α,β)/T_{opt}$$

The parameter pair (α, β) with the highest efficiency represents the optimal values for the thresholds α and β. Table 1 is below is illustrative of a set of values for the efficiency $E_{sw}(α, β)$.

TABLE 1

|  | β = 12 | β = 18 | β = 24 | β = 36 |
|---|---|---|---|---|
| α = 6 | 0.20 | 0.20 | 0.20 | 0.20 |
| α = 9 | 0.47 | 0.94 | 0.70 | 0.66 |
| α = 12 | 0.47 | 0.94 | 0.70 | 0.66 |
| α = 18 | 0.47 | 0.91 | 0.69 | 0.63 |

If the current data rate $R_{avg}$ is not above below the predetermined threshold a or above predetermined threshold β, then the optimization component 302 can select the channel width $B_L$ as the optimum channel width. The channel width $B_L$ is stored in the probing component, and is the channel width for which the average throughput entry $T_L$ is the highest. The optimization component 302 communicates the optimum channel width to the clock component 206.

Additionally or alternatively, the optimization component 302 can determine the optimum channel width based on the energy consumption. The optimization component 302 can select the channel width that is most energy efficient $EPJ_i$, instead of the channel width $B_L$ having the highest throughput.

In many current wireless transmitter 112 designs the channel width is determined by a frequency synthesizer in the radio frequency (RF) front end circuitry. Often the frequency synthesizer is implemented using a Phased Locked Loop (PLL) 312. A frequency divider determines the center frequency, and the frequency of a reference clock 208 is used by the PLL 312 to determine the channel width. It is appreciated that the wireless receiver 114 can include similar components (e.g. a reference clock 316, a PLL 318, a MAC processor 320, and an auto-rate component 322), but for simplicity of explanation the operation of the system 300 will be described in reference to the wireless transmitter 112.

The clock component 206 can adjust the reference clock 208 that drives the PLL 312 to achieve the desired channel width. Subsequently, the wireless transmitter 112 transmits the signal at said channel width. Additionally, in many current wireless transmitter 112 designs the reference clock 208 is common to the RF transmitter and a baseband/Media Access Control (MAC) processor 314. The baseband/MAC processor 314 uses the reference clock 208 to control access to the wireless network by regulating timing, encryption, encoding/decoding, and data transmission. Therefore, adjusting the reference clock 208 affects IEEE 802.11 timing parameters. For example, a 4 μs orthogonal frequency division multiplexing (OFDM) symbol in a 20 MHz channel width results in symbols of length 2 μs at 40 MHz, and 16 μs at 5 MHz. Only timing parameters are affected. Therefore, irrespective of channel width, modulation 24 OFDM coding (24 Mbps at 20 MHz using 16-QAM, 1/2 rate encoder) carries the same 96 data bits per symbol. However, since symbol lengths are different across channel widths, modulation 24 coding scheme gives 6 Mbps at 5 MHz, 12 Mbps at 10 MHz, 24 Mbps at 20 MHz, and 48 Mbps at 40 MHz.

The implementation component 304 maintains one or more rate tables that are loaded by the device driver of the wireless transmitter 112 when the channel width is changed. The rate tables contain different rates supported by each channel width. Additionally, the implementation component 304 can modify the 802.11 slot time to be the same across all channel widths, which ensures fair contention among flows on various channel widths. The implementation component 304 can also adjust the computation for packet durations according to the different channel widths. The binding component 306 maintains the 802.11 associations when the dynamic adaptation component 108 dynamically adjusts the channel width of the wireless transmitter 108.

In view of the exemplary systems described supra, methodologies that may be implemented in accordance with the disclosed subject matter will be better appreciated with reference to the flow charts of FIGS. 4-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 4:
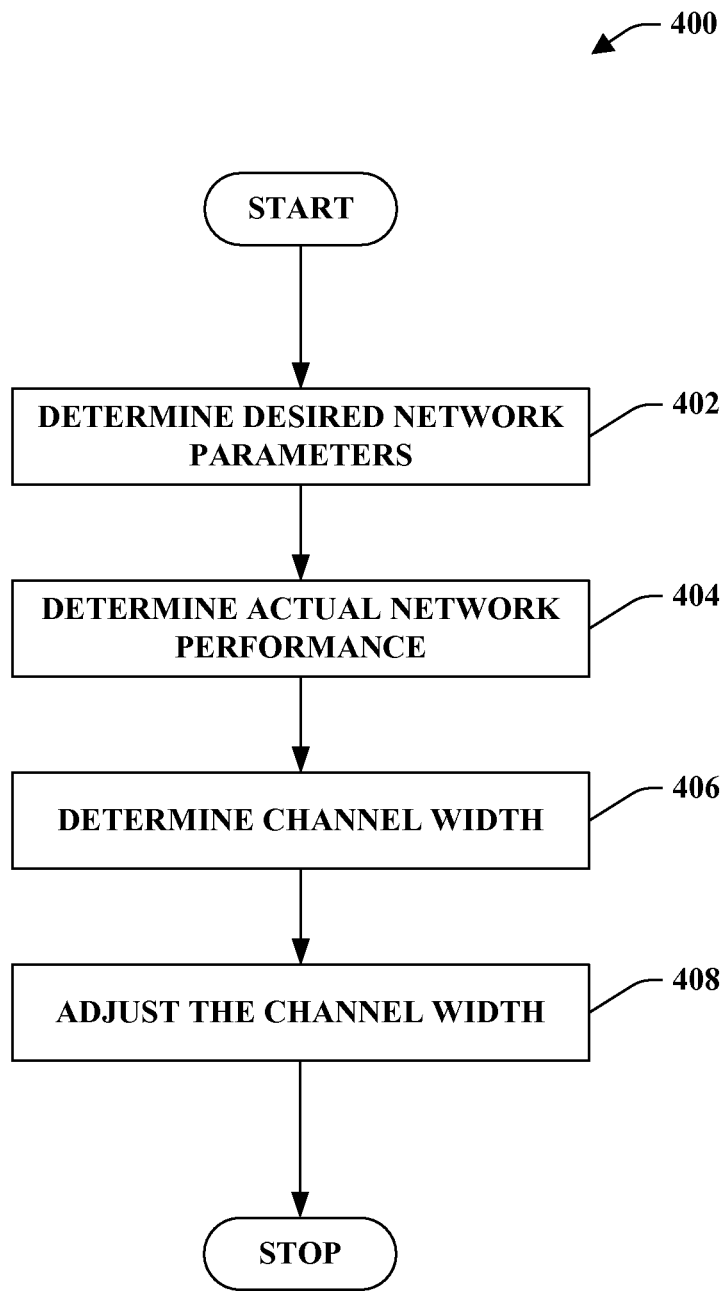
FIG. 4 is a flow chart illustrating a generalized methodology of adaptive channel width in accordance with the present invention.

FIG. 4 illustrates a methodology 400 that facilitates adaptively controlling channel width in wireless networks. At 402, one or more desired parameters are determined for one or more network characteristics. The desired parameters can be determined by a user, an associated application, or a higher-layer protocol. Additionally, the network characteristics can include but are not limited to range, power consumption, throughput, signal to noise ratio (SNR), resilience to delay spread, and capacity. At 404, the actual values of the network performance are determined. The actual values can be obtained, measured, calculated, and/or estimated (as discussed supra), and can include but are not limited to energy consumption, data rate, loss rate, interference, link condition, signal-to-noise ratio (SNR), and signal strength. At 406, a channel width can be determined to achieve the desired network parameters. For example, if the current channel width is 5 MHz, and at 402 it is determined that the throughput should be increased by a factor of 2, then the channel width should be 10 MHz (e.g. doubled) to achieve the desired throughput. At 408, the channel width of the wireless transmitter is adjusted to the determined width. For example, the channel width can be adjusted by changing the frequency of a reference clock that a drives a PLL in the wireless transmitter.

Figure 5:
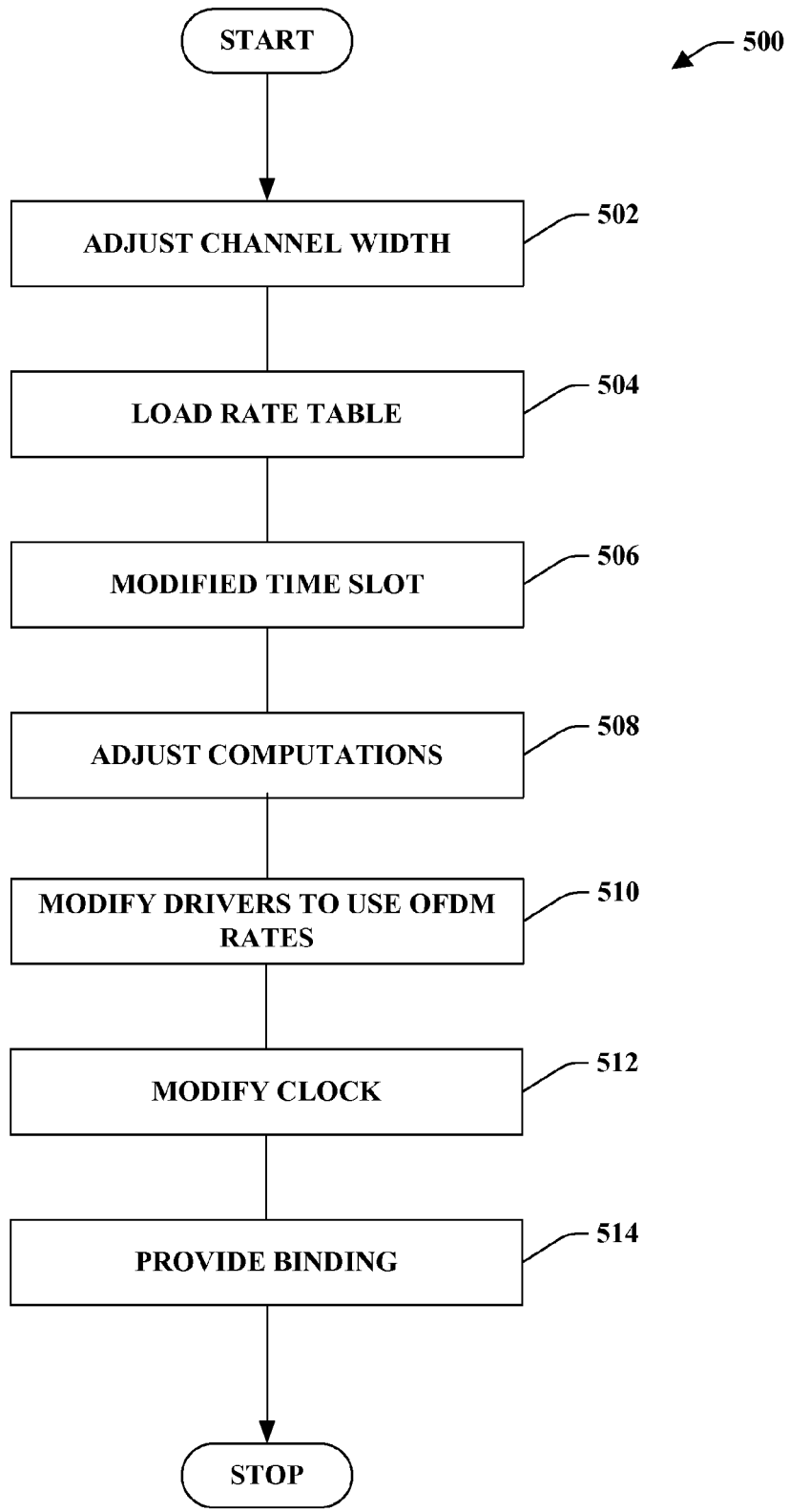
FIG. 5 is a flow chart illustrating a generalized methodology of adapting channel width in accordance with the present invention.

FIG. 5 illustrates a methodology 500 that facilitates adaptively controlling channel width in wireless networks using off-the-shelf wireless transmitters. As previously stated, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. At 502, the channel width of the wireless transmitter is adjusted. In many current wireless transmitter chipset designs the channel width is determined by a frequency synthesizer in the radio frequency (RF) front end circuitry. Often the frequency synthesizer is implemented using a Phased Locked Loop (PLL). A frequency divider determines the center frequency, and the frequency of a reference clock is used by the PLL to determine the channel width. Therefore, the channel width can be adjusted by changing the frequency of the reference clock that drives the PLL.

Additionally, adjusting the reference clock affects IEEE 802.11 timing parameters, because in many current wireless transmitters the reference clock is common to the RF transmitter and a baseband/Media Access Control (MAC) processor. The baseband/MAC processor uses the reference clock to control access to the wireless network by regulating timing, encryption, encoding/decoding, and data transmission. For example, a 4 µs orthogonal frequency division multiplexing (OFDM) symbol in a 20 MHz channel results in symbols of length 2 µs at 40 MHz, and 16 µs at 5 MHz. Only timing parameters are affected. Therefore, irrespective of channel width, modulation 24 OFDM coding (24 Mbps at 20 MHz using 16-QAM, 1/2 rate encoder) carries the same 96 data bits per symbol. However, since symbol lengths are different across channel widths, modulation 24 coding scheme gives 6 Mbps at 5 MHz, 12 Mbps at 10 MHz, 24 Mbps at 20 MHz, and 48 Mbps at 40 MHz.

At 504, a rate table is loaded by the wireless transmitter's device driver when the channel width is changed. The rate table includes different rates supported by the each channel width. To ensure fair contention among flows on various channel widths, the 802.11 slot time is modified to be the same (e.g. 20 µs) across all channel widths at 506.

At 508, the computation for packet durations is adjusted accordingly for different widths. For interoperability with 802.11b stations, 802.11g uses 4 802.11b DSSS rates (1, 2, 5.5 and 11), and 6 OFDM rates (12 to 54 Mbps), and uses a 44 MHz clock frequency. To isolate the impact of channel width, the driver is modified to use only OFDM rates (6 to 54 Mbps) in 802.11g mode at 510. In addition, for ease of exposition, the clock frequency is modified to 40 MHz so that channel widths are scaled in multiples of 2 at 512. At 514, support is added to dynamically change the channel width without breaking 802.11 associations.

Figure 6:
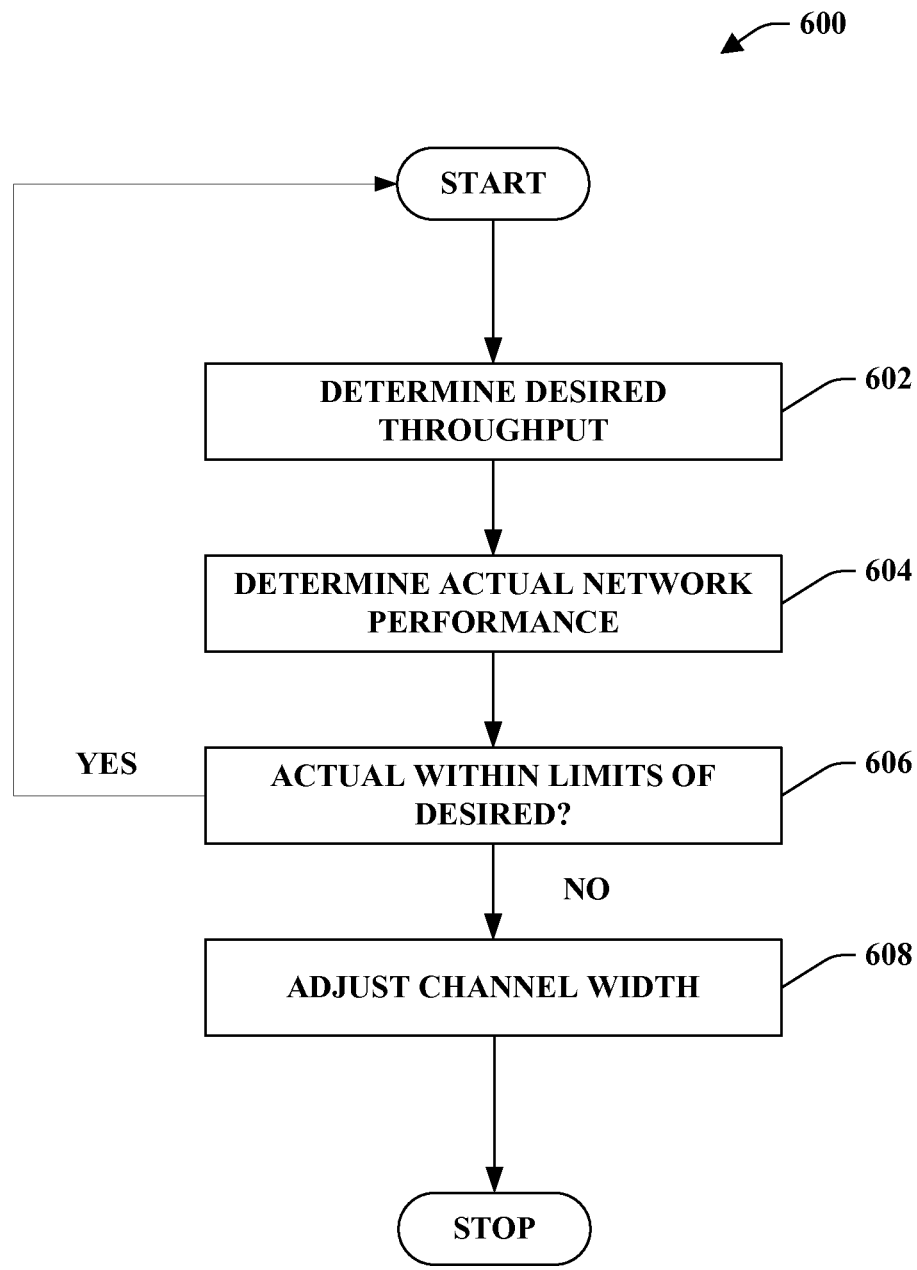
FIG. 6 is a flow chart illustrating a generalized methodology of adaptive channel width in accordance with the present invention.

FIG. 6 illustrates a methodology 600 for controlling throughput in a wireless network by adaptively controlling the channel width. At 602, a desired throughput for a wireless network can be determined. The desired throughput can be determined by a user, an associated application, a higher-level protocol, or based on network performance.

At 604, the actual performance of the wireless network is determined. The actual performance values can be measured, calculated, or estimated; and can include but are not limited to energy consumption, data rate, loss rate, interference, link condition, signal-to-noise ratio (SNR), and signal strength.

At 606, the actual network performance values are compared to the desired network throughput. If the actual network performance values are within a predetermined tolerance range that would likely produce the desired throughput, then the methodology returns to step 602. However, if the actual network performance is not producing the desired throughput, then the channel width is adjusted to achieve the desired throughput at 608.

Throughput is the measure of the data bytes transmitted per second in a wireless network, and is typically measured in bytes per second (Bps). According to Shannon's capacity formula, the theoretical capacity of a communication channel is proportional to the channel width. Consequently, in theory increasing the channel width by a factor of two also increases the throughput by a factor of two. For example, if the throughput is 4 Mbps using a 5 MHz channel, then the throughput should be approximately 8 Mbps using a 10 MHz channel. However, when employing a standard such as IEEE 802.11 the real world results may follow the theoretical capacity according to Shannon's formula, but may not yield the exact theoretical results. This can be attributed to overheads in the 802.11 structure, such as various inter-frame spacing. Since some of these overheads are fixed in terms of absolute time, their relative overhead is higher for wider channels. The actual throughput can be determined using the equation:

$$t = t_{DIFS} + t_{DATA} + t_{SIFS} + t_{ACK}$$

where $t_{DIFS}$ is the time required for a DCF Interframe Space (DIFS), $t_{DATA}$ is the time necessary to send a set of data, $t_{SIFS}$ is the time required for a Short Interframe Space (SIFS), and $t_{ACK}$ is the time needed to send an acknowledgement. The inverse of the per packet transmission time (1/t) multiplied by the number of bytes per package exchange is the throughput.

According to the 802.11g standard, the basic timing parameters in ad hoc mode are $t_{SIFS}=10$ µs, $t_{SLOT}=20$ µs, and $t_{DIFS}=2\text{slot}+t_{SIFS}=50$ µs. For the actual data packet, data is divided into a series of symbols, each encoding a number of bits. At modulation-R, 4·R data bits are encoded per symbol. The transmission time for each symbol is $t_{symb}=4$ µs, and the data symbols are wrapped by a 20 µs preamble (synchronization and PLCP header) and a 6 µs signal extension.

Figure 7:
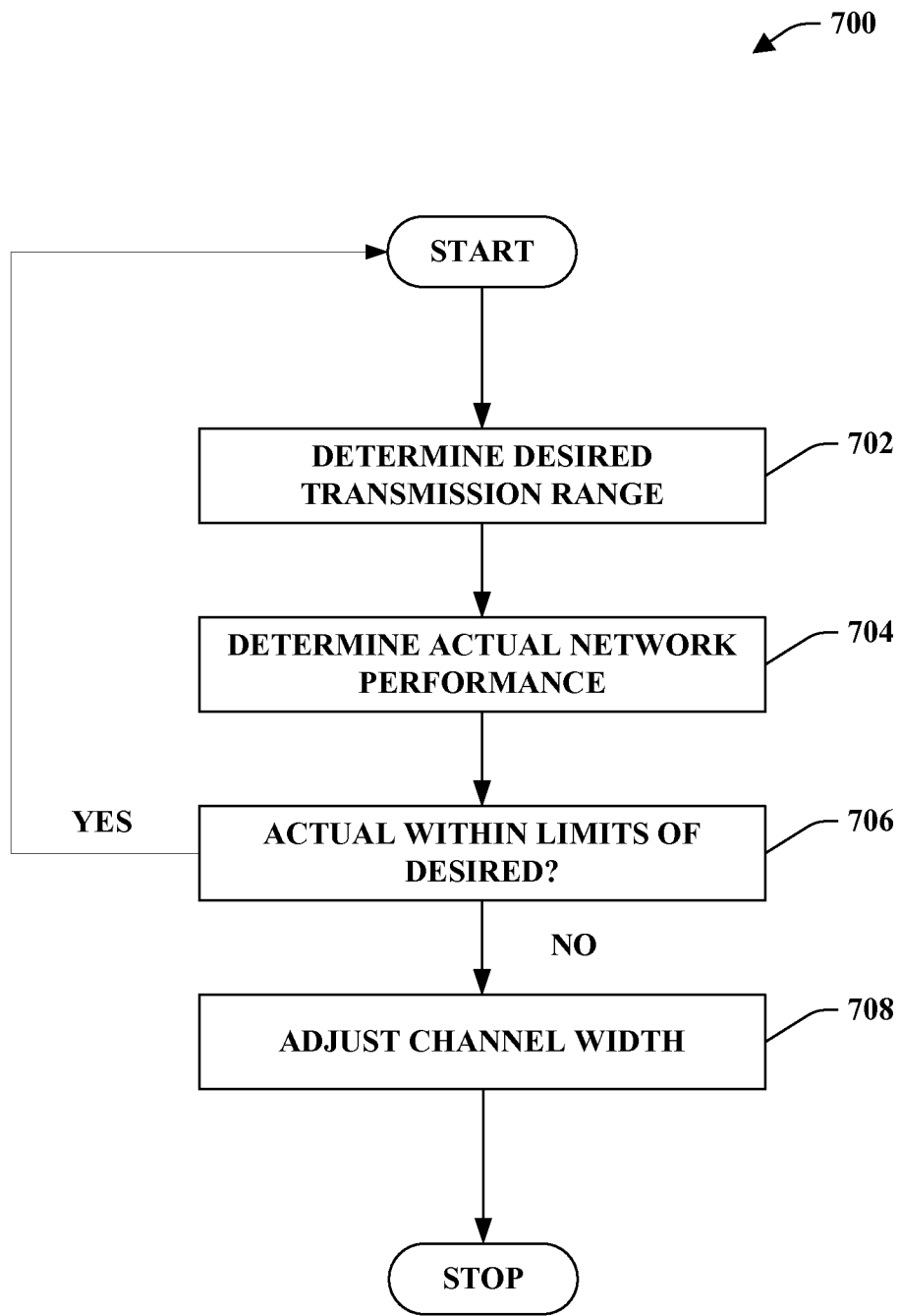
FIG. 7 is a flow chart illustrating a generalized methodology of adaptive channel width in accordance with the present invention.

FIG. 7 illustrates a methodology 700 for controlling the transmission range of wireless signal by adaptively controlling the channel width. At 702, a desired transmission range for a wireless signal can be determined. The transmission range is the distance a wireless transmitter can transmit a wireless signal to a wireless receiver without significant loss. The desired transmission range can be determined by a user, an associated application, a higher-level protocol, or based on network performance. In addition, the desired transmission range can be determined as a function of at least one of: actual distance (e.g. meters, offices, etc.), range threshold, or loss ratio. The range threshold is minimum attenuation at which the loss rate is less than X %, where X is a real number between 0 and 100.

At 704, the actual performance of the wireless network is determined. The actual performance values can be measured, calculated, or estimated; and can include but are not limited to energy consumption, data rate, loss rate, interference, link condition, signal-to-noise ratio (SNR), and signal strength.

At 706, the actual network performance values are compared to the desired network transmission range. If the actual network performance values are within a predetermined tolerance range that would likely produce the desired transmission range, then the methodology returns to step 702. However, if the actual network performance is not producing the desired transmission range, then the channel width is adjusted to achieve the desired transmission range at 708.

The transmission range is largely a function of two factors: signal-to-noise ratio (SNR) and resilience to delay spread. The SNR is the ratio of a signal power to the noise power corrupting the signal. The delay spread is the time difference between the arrival of the first and last copies of the multipath components. At long communications distances, wireless receivers get multiple copies of a signal due to multipath reflections. Delay spread can hinder correct decoding of a transmission at the receiver because a signal begins to interfere with time-delayed copies of itself. A guard interval can be used at the start of every symbol to counter delay spread.

As previously discussed, given equivalent noise per unit Hz across various widths, the SNR is higher for narrower widths, giving narrow widths a longer transmission range. Additionally, the guard interval increases by a factor of two each time the channel width is halved. For example, if the guard interval is 100 ns at 10 MHz, then the guard interval will be 200 ns at 5 MHz. Therefore, narrower channel widths provide higher resilience to delay spread and increased signal-to-noise ratio compared to wider channels.

Figure 8:
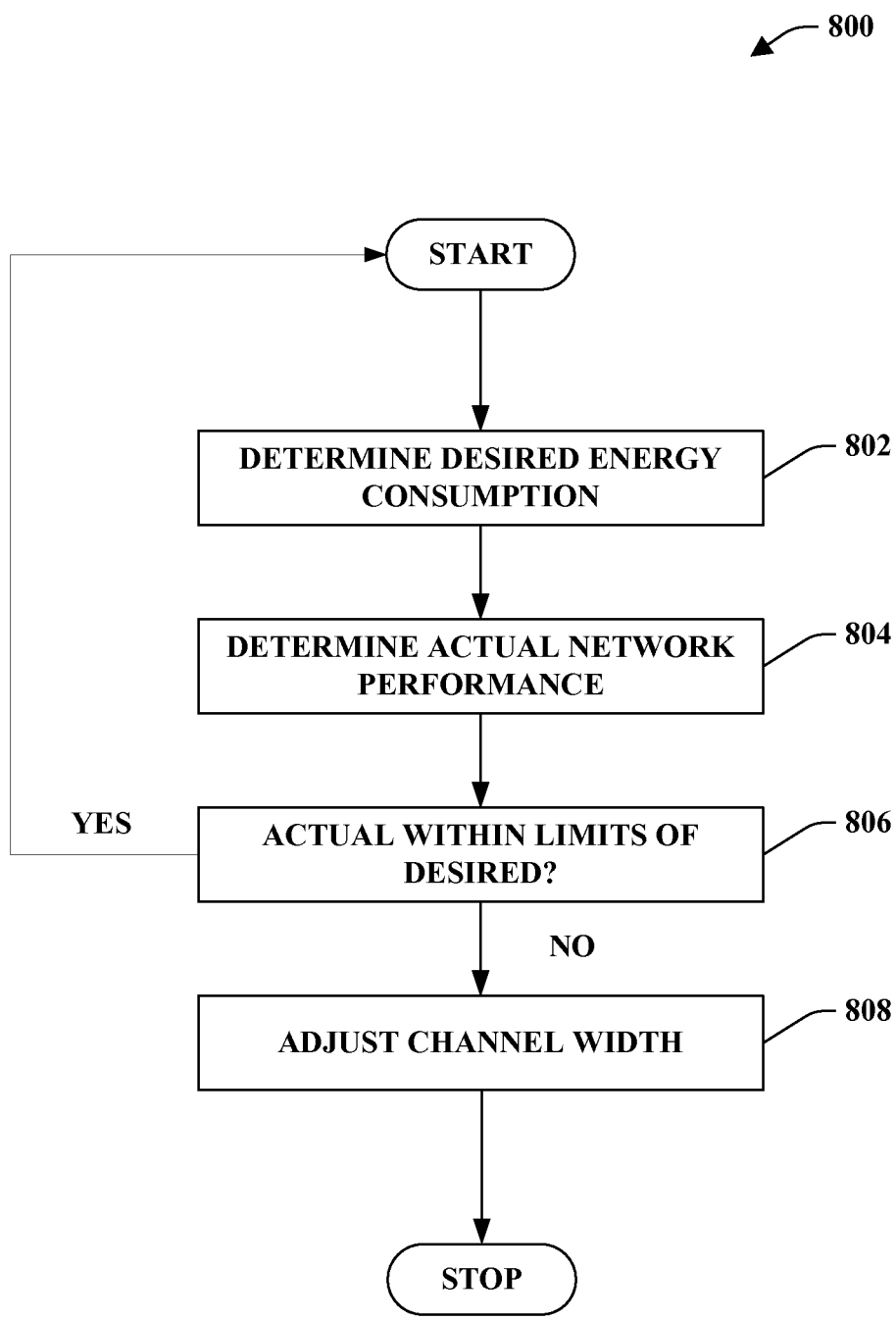
FIG. 8 is a flow chart illustrating a generalized methodology of adaptive channel width in accordance with the present invention.

FIG. 8 illustrates a methodology 800 for controlling the energy consumption of the wireless transmitter by adaptively controlling the channel width. At 802, a desired energy consumption for a wireless transmitter can be determined. The energy consumption is the power required to send a wireless signal. The desired energy consumption can be determined by a user, an associated application, a higher-level protocol, or based on network performance.

At 804, the approximate energy consumption of the wireless transmitter is determined (discussed supra). At 806, the desired energy consumption is compared to the actual consumption. At 808, if the desired energy consumption and actual energy consumption are not the same or within a predetermined tolerance range, then the channel width is adjusted to achieve the desired energy consumption. As previously discussed, there exist a linear relationship between the channel width and power consumption, wider channels consume more power. This linear relationship can be explained at least in part by slower clock speeds that are used for narrower channel widths.

Figure 9:
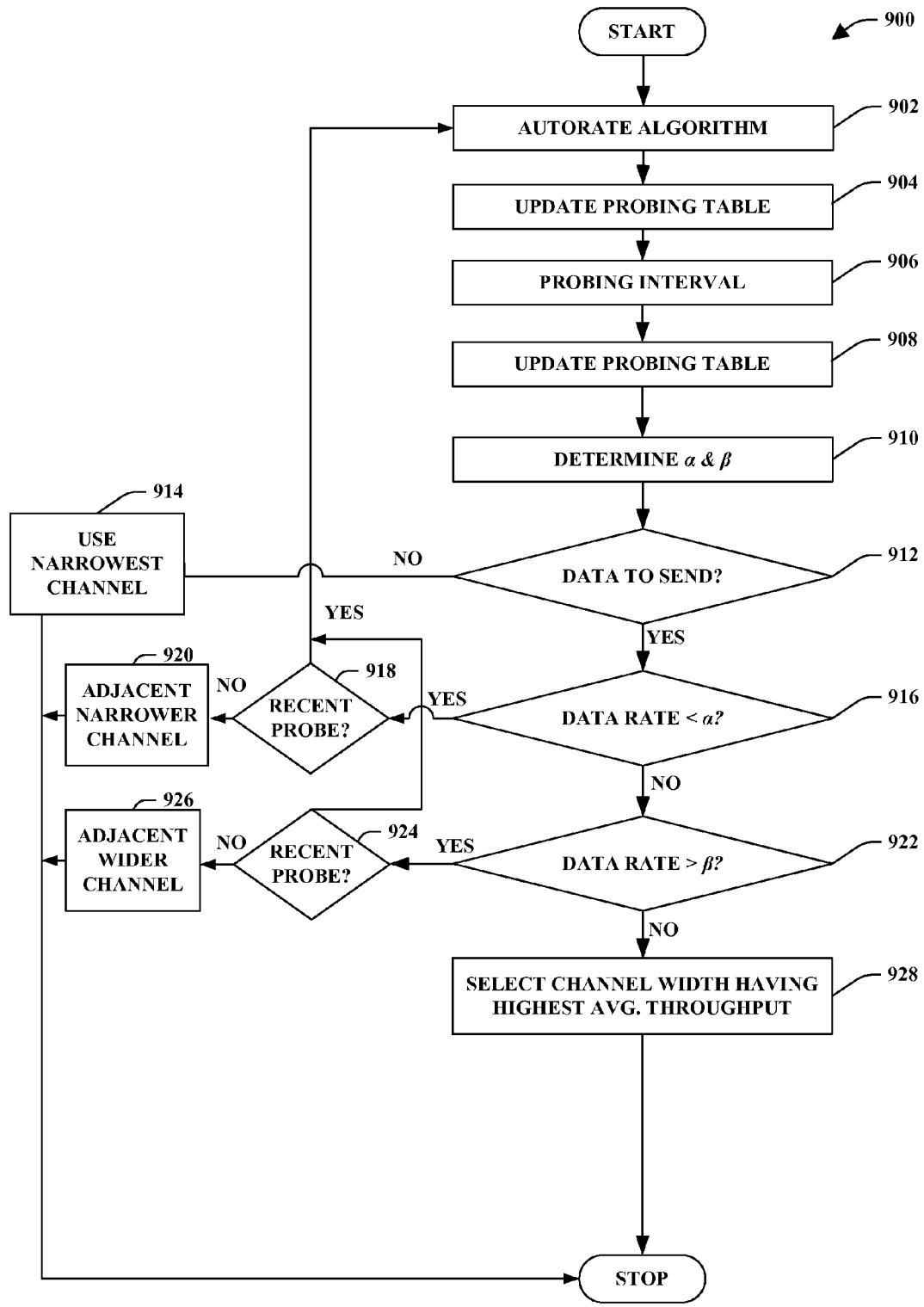
FIG. 9 is a flow chart illustrating a generalized methodology of optimizing adaptive channel width in accordance with the present invention.

Referring now to FIG. 9, a methodology 900 for determining an optimum channel width is illustrated in accordance with an aspect of the current invention. At 902, an auto-rate algorithm determines an average throughput $T_i$ and an average data rate $R_i$ for each channel width $B_i$, where i is the number of channel widths. At 904, a sender probing table is updated with the average throughput $T_i$ and an average data rate $R_i$ for each channel width $B_i$. At 906, a probing interval is initiated. During the probing interval, the sender determines the average throughput $T_{avg}$ and data rate $R_{avg}$ on the current channel $B_{cur}$. At 908, the probing table is updated with the average throughput and data rate on the current channel.

At 910, the optimal values for $\alpha$ and $\beta$ are determined. The threshold values $\alpha$ and $\beta$ can be determined based at least in part on three objectives: avoiding disconnections, avoiding unnecessary probing, and probing channels sufficiently often in order to avoid getting stuck on a suboptimal channel width. The optimal values for $\alpha$ and $\beta$ can be determined by computing the long term average throughput $T_{sw}(\alpha, \beta)$ achieved when starting with an arbitrary width. Next, determine the average throughput $T_{opt}$ achieved by a hypothetical optimal algorithm that constantly transmits using the best possible channel width. Then, determine the efficiency $E_{sw}(\alpha, \beta)$ of the parameter pair $(\alpha, \beta)$ as the ratio between the long term average throughput $T_{sw}$ and the hypothetical optimal average throughput $T_{opt}$. For each parameter pair $(\alpha, \beta)$ the efficiency $E_{sw}(\alpha, \beta)$ can be determined using the equation:

$$E_{sw}(\alpha,\beta)=T_{sw}(\alpha,\beta)/T_{opt}$$

the parameter pair $(\alpha, \beta)$ having the highest efficiency represents the optimal values for the thresholds $\alpha$ and $\beta$.

At 912, it is determined if there is data to send. If there is no data to send the narrowest channel width available is used at 914. This minimizes power consumption and increases the range.

At 916, it is determined if the current data rate $R_{avg}$ is below the predetermined threshold $\alpha$. To prevent oscillation, the nodes do not probe a channel width if it was recently probed within a predetermined number of probing intervals X at 918. For example, X can be 5, and the nodes will not probe the channel width if it was probed within the last 5 probing intervals. At 920, if the current data rate $R_{avg}$ is below a predetermined threshold $\alpha$, and if the channel width has not been probed the predetermined number of probing intervals X, then the nodes switch to the adjacent narrower channel width.

At 922, if the current data rate $R_{avg}$ is not below a predetermined threshold $\alpha$, then it is determined if the current data rate $R_{avg}$ is above a predetermined threshold $\beta$. To prevent oscillation, the nodes do not probe the channel width if it was recently probed within a predetermined number of probing intervals X at 924. For example, X can be 5, and the nodes will not probe the channel width if it was probed within the last 5 probing intervals. At 926, if the current data rate $R_{avg}$ is above a predetermined threshold $\beta$, then the nodes switch to the adjacent wider channel width.

At 928, if the current data rate $R_{avg}$ is not above the predetermined threshold $\beta$, then the nodes switch to the channel width $B_L$ for which the average throughput entry $T_L$ in the probing table is the highest.

Figure 10:
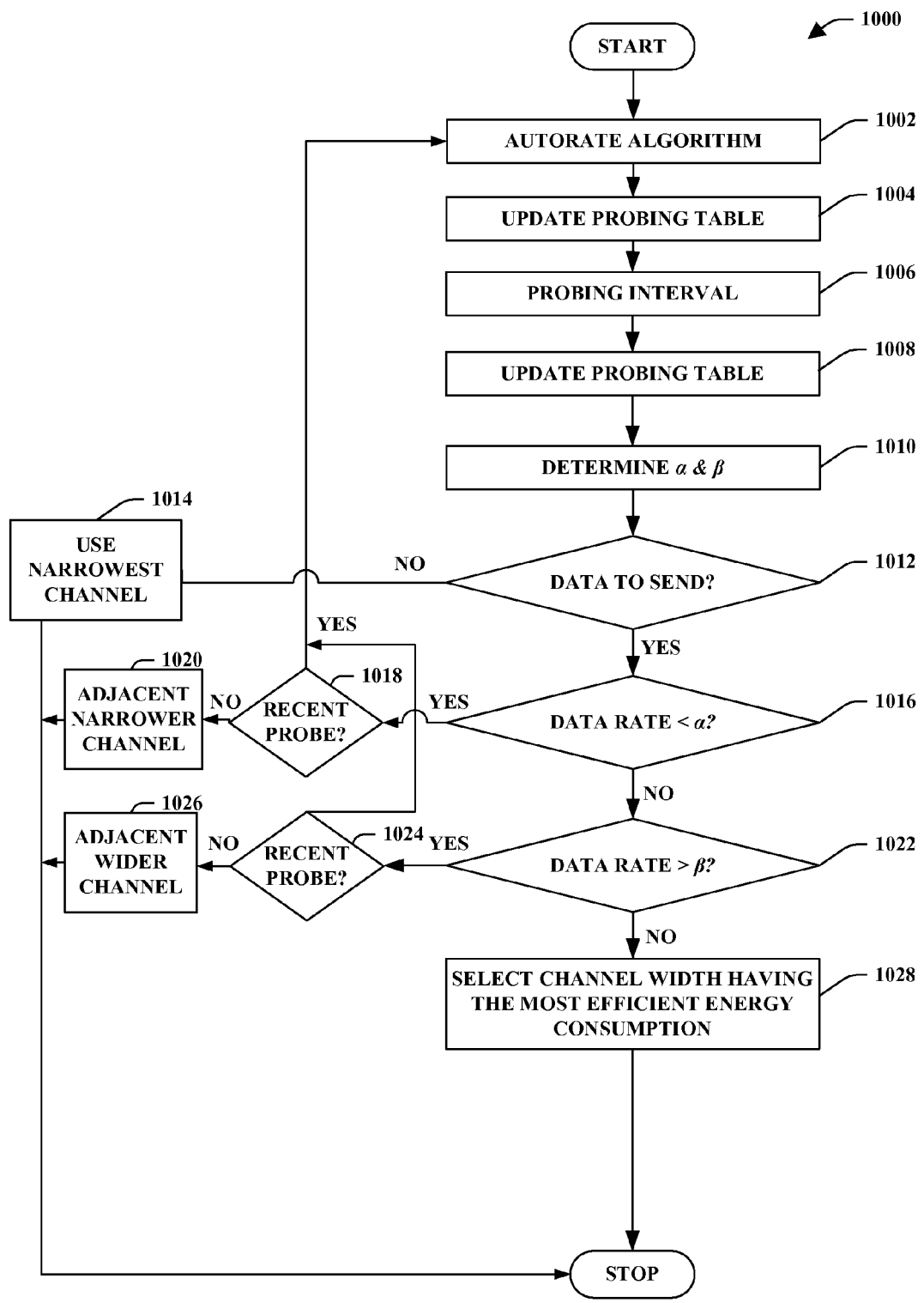
FIG. 10 is a flow chart illustrating a generalized methodology of optimizing adaptive channel width in accordance with the present invention.

Referring now to FIG. 10, a methodology 1000 for determining a channel width for energy optimization is illustrated in accordance with an aspect of the current invention. At 1002, a state-of-the-art auto-rate algorithm determines an average an average data rate $R_i$ for a channel width $B_i$. Additionally, the bits per Joule $EPJ_i$ is calculated for the channel width $B_i$. To compute $EPJ_i$ for a sample interval, the number of bits successfully transmitted and the total energy spent is required. At 1004, a sender probing table is updated with the average bits per Joule and the average data rate. At 1006, a probing interval is initiated. During the probing interval, the sender measures the average bits per Joule $EPJ_{avg}$ and data rate $R_{avg}$ on the current channel $B_{cur}$. At 1008, the probing table is updated with the average bits per Joule $EPJ_{avg}$ and data rate $R_{avg}$ on the current channel $B_{cur}$.

At 1010, The optimal values for $\alpha$ and $\beta$ are determined. The threshold values $\alpha$ and $\beta$ can be determined based at least in part on three objectives: avoiding disconnections, avoiding unnecessary probing, and probing channels sufficiently often in order to avoid getting stuck on a suboptimal channel width. The optimal values for $\alpha$ and $\beta$ can be determined by computing the long term average throughput $T_{sw}(\alpha, \beta)$ achieved when starting with an arbitrary width. Next, determine the average throughput $T_{opt}$ achieved by a hypothetical optimal algorithm that constantly transmits using the best possible channel width. Then, determine the efficiency $E_{sw}(\alpha, \beta)$ of the parameter pair $(\alpha, \beta)$ as the ratio between the long term average throughput $T_{sw}$ and the hypothetical optimal average throughput $T_{opt}$. For each parameter pair $(\alpha, \beta)$ the efficiency $E_{sw}(\alpha, \beta)$ can be determined using the equation:

$$E_{sw}(\alpha,\beta)=T_{sw}(\alpha,\beta)/T_{opt}$$

the parameter pair ($\alpha$, $\beta$) having the highest efficiency represents the optimal values for the thresholds $\alpha$ and $\beta$.

At 1012, it is determined if there is data to send. If there is no data to send the narrowest channel width available is used at 1014. This minimizes power consumption and increases the range.

At 1016, it is determined if the current data rate $R_{avg}$ is below a predetermined threshold $\alpha$. To prevent oscillation, the nodes do not probe a channel width if it was recently probed within a predetermined number of probing intervals X at 1018. For example, X can be 5, and the nodes will not probe the channel width if it was probed within the last 5 probing intervals. At 1020, if the current data rate $R_{avg}$ is below a predetermined threshold $\alpha$, and the channel width have not been probed with the predetermined number of probing intervals X, then the nodes switch to the adjacent narrower channel width.

At 1022, if the current data rate $R_{avg}$ is not below a predetermined threshold $\alpha$, then it is determined if the current data rate $R_{avg}$ is above a predetermined threshold $\beta$. To prevent oscillation, the nodes do not probe the channel width if it was probed within a predetermined number of probing intervals X at 1024. For example, X can be 5, and the nodes will not probe the channel width if it was probed within the last 5 probing intervals. At 1026, if the current data rate $R_{avg}$ is above a predetermined threshold $\beta$, then the nodes switch to the adjacent wider channel width.

At 1028, if the current data rate $R_{avg}$ is not above the predetermined threshold $\beta$, then the nodes switch to the channel width $EPJ_{avg}$ for which the energy efficiency is the highest.

Figure 11:
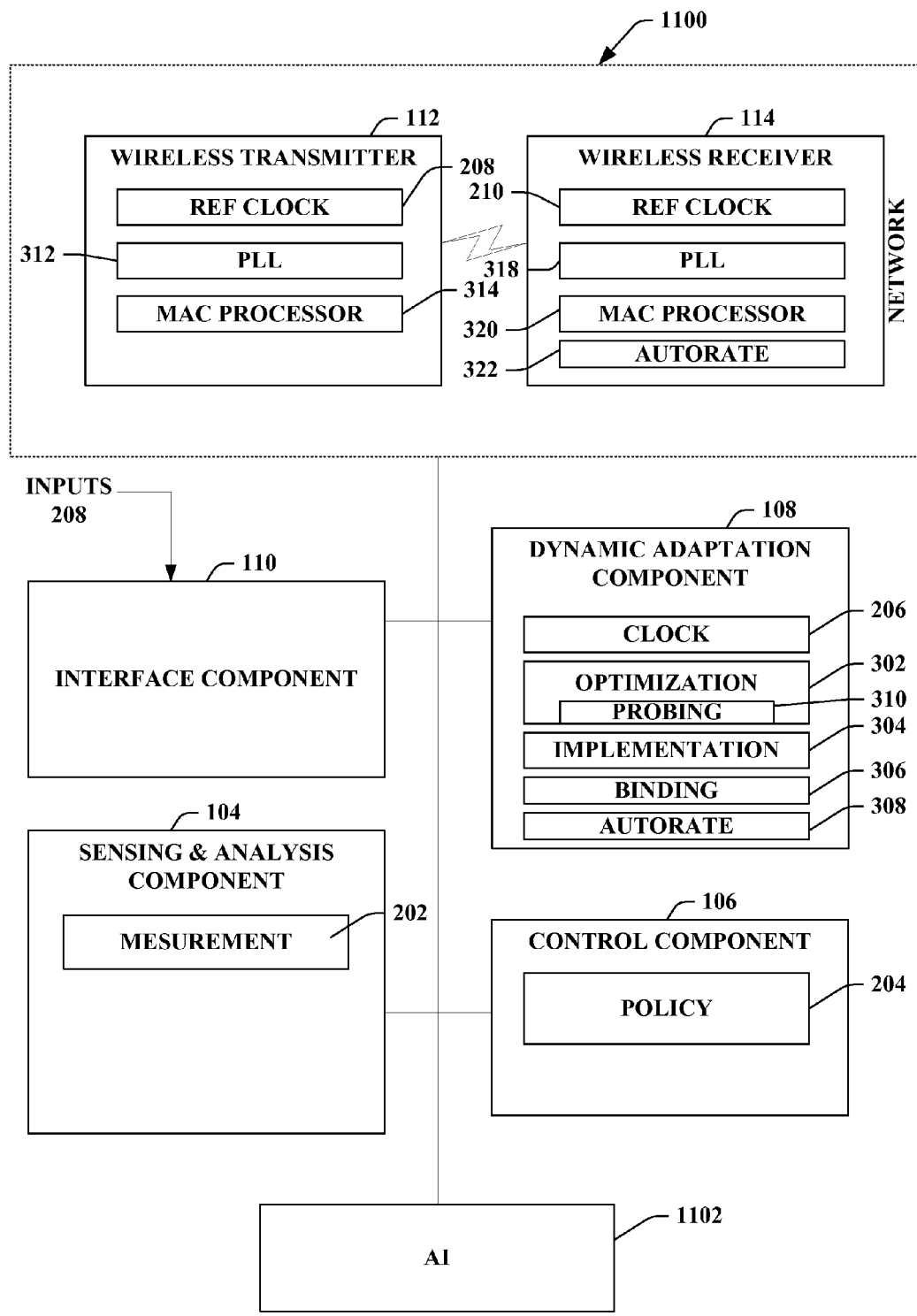
FIG. 11 illustrates a system that employs an artificial intelligence component which facilitates automating one or more features in accordance with the subject invention.

FIG. 11 illustrates a system 1100 that employs an artificial intelligence (AI) component 1102 which facilitates automating one or more features in accordance with the subject invention. The subject invention (e.g., in connection with inferring) can employ various AI-based schemes for carrying out various aspects thereof. For example, a process for dynamically adjusting the channel width can be facilitated via an automatic classifier system and process.

A classifier is a function that maps an input attribute vector, x=(x1, x2, x3, x11, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier(s) can be used to automatically learn and perform a number of functions, including but not limited to determining according to a predetermined criteria when to update or refine the previously inferred schema, tighten the criteria on the inferring algorithm based upon the kind of data being processed (e.g., financial versus non-financial, personal versus non-personal, . . . ), and at what time of day to implement tighter criteria controls (e.g., in the evening when system performance would be less impacted).

Figure 12:
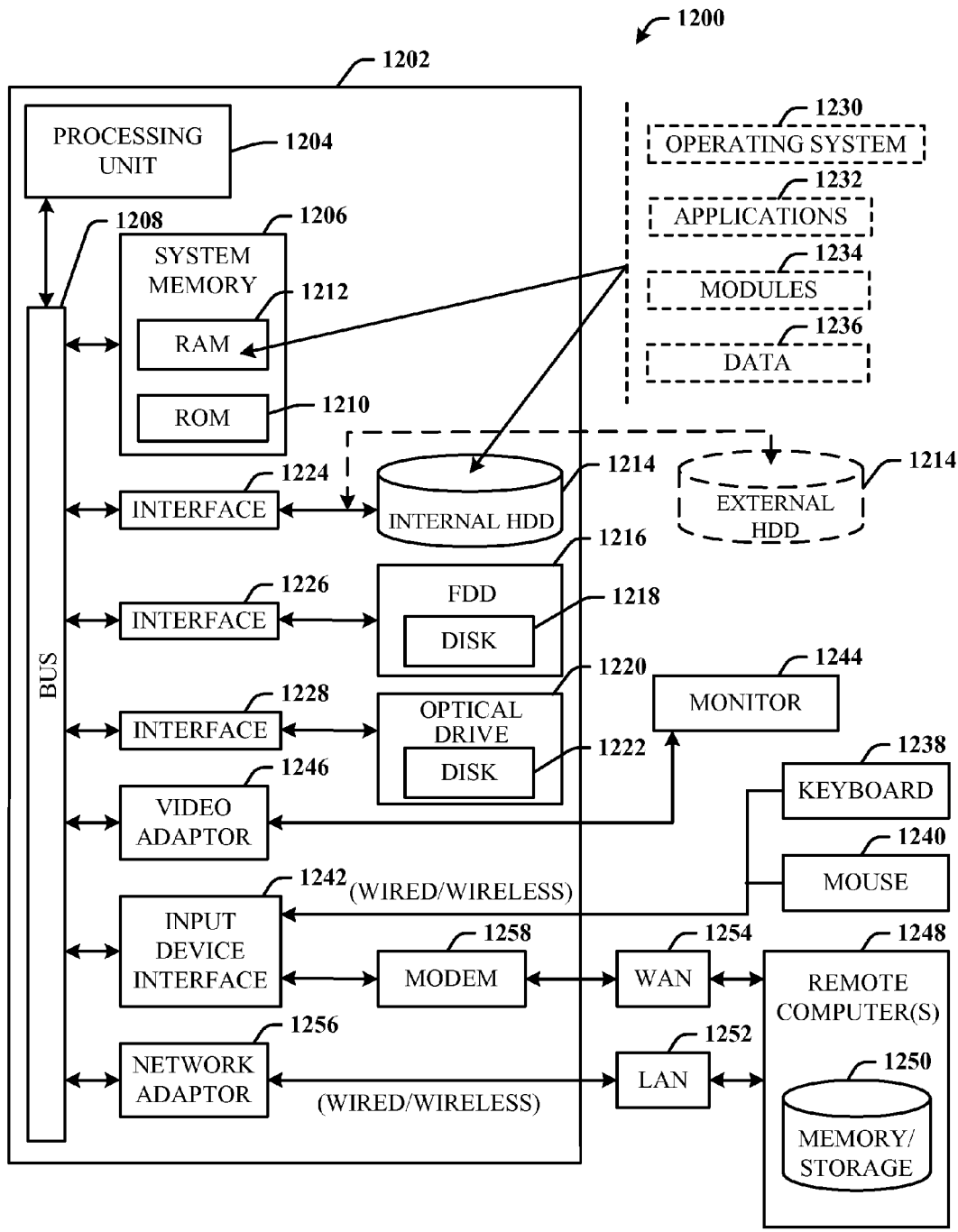
FIG. 12 is a schematic block diagram illustrating a suitable operating environment in accordance with an aspect of the subject invention.

Referring now to FIG. 12, there is illustrated a block diagram of a computer operable to execute the disclosed architecture. In order to provide additional context for various aspects of the subject invention, FIG. 12 and the following discussion are intended to provide a brief, general description of a suitable computing environment 1200 in which the various aspects of the invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer readable media. Computer readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, there is illustrated an exemplary environment 1200 for implementing various aspects of the invention that includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the invention.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the invention can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices, and companies, and facilitate enterprise-wide computer networks, such as intranets, all of which may connect to a global communication network, e.g., the Internet.

When used in a LAN networking environment, the computer 1202 is connected to the local network 1252 through a wired and/or wireless communication network interface or adapter 1256. The adaptor 1256 may facilitate wired or wireless communication to the LAN 1252, which may also include a wireless access point disposed thereon for communicating with the wireless adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.)

to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
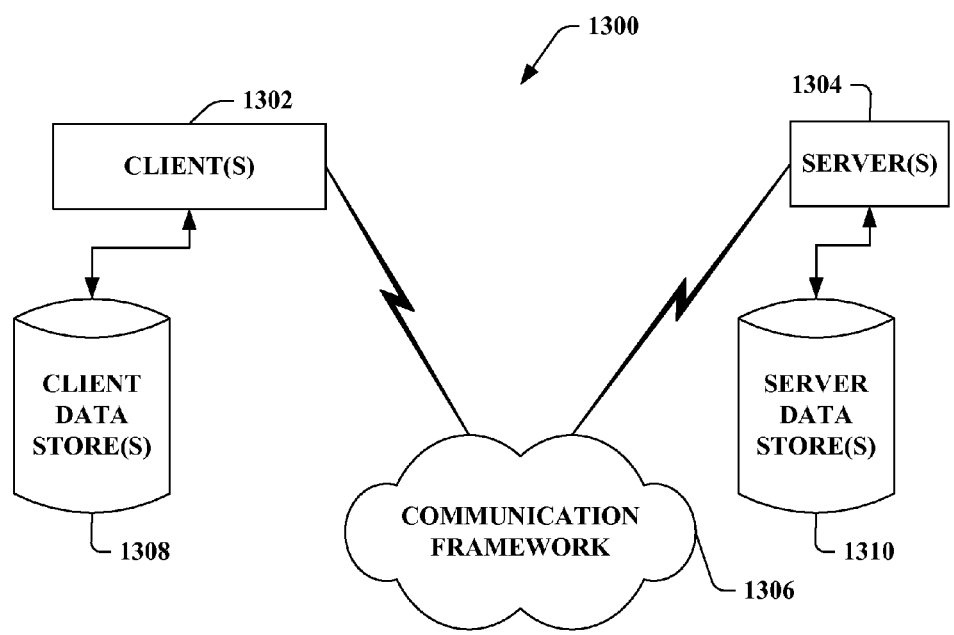
FIG. 13 is a schematic block diagram of a sample-computing environment with which the subject invention can interact.

Referring now to FIG. 13, there is illustrated a schematic block diagram of an exemplary computing environment 1300 in accordance with the subject invention. The system 1300 includes one or more client(s) 1302. The client(s) 1302 can be hardware and/or software (e.g., threads, processes, computing devices). The client(s) 1302 can house cookie(s) and/or associated contextual information by employing the invention, for example.

The system 1300 also includes one or more server(s) 1304. The server(s) 1304 can also be hardware and/or software (e.g., threads, processes, computing devices). The servers 1304 can house threads to perform transformations by employing the invention, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the invention. It is, of course, not possible to describe every conceivable combination of components or methodologies for purposes of describing the subject invention, but one of ordinary skill in the art may recognize that many further combinations and permutations of the invention are possible. Accordingly, the invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   a wireless transmitter that sends one or more symbols in a wireless signal via a channel having a specified width;
   a sensing and analysis component that determines a value for at least one attribute of at least one of: the wireless signal, or the wireless transmitter; and
   a dynamic adaptation component that adjusts the channel width based at least in part on:
      a determination of a parameter pair that includes a first threshold value and a second threshold value, the first threshold value and the second threshold value comprising average data rates corresponding to a maximum data throughput efficiency of the channel, the determination of the parameter pair being based at least in part on a number of probing intervals between probes of the channel;
      a determination of a current average data rate for the channel at the specified width; and
      a determination of a relationship between the current average data rate and the parameter pair, the channel width being adjusted based at least in part on the relationship.

2. The system of claim 1, wherein the attribute includes at least one of energy consumption, data rate, loss rate, interference, link condition, signal-to-noise ratio (SNR), or signal strength.

3. The system of claim 1, wherein the channel having a first bandwidth hosting a plurality of flows is partitioned into a plurality of channels having a second bandwidth in order to increase capacity or decrease interference, and the second bandwidth for each flow being narrower than the first bandwidth.

4. The system of claim 1, wherein:
   the channel width initially corresponds to a preset channel width, and
   the dynamic adaptation component adjusts the preset channel width.

5. The system of claim 1, wherein the dynamic adaptation component further comprises a binding component that maintains networking associations when the dynamic adaptation component adjusts the channel width.

6. The system of claim 1, further comprising a control component that obtains at least one desired optimization objective.

7. The system of claim 6, wherein the desired optimization objective includes at least one of throughput, transmission range, capacity, or energy consumption.

8. The system of claim 6, wherein the dynamic adaptation component further comprises an optimization component that determines an optimum channel width for the wireless transmitter based at least in part on at least one of the attribute or the desired optimization objective.

9. The system of claim 8, wherein the optimum channel width is at least one of: a channel width having a greatest throughput, a channel width having a most efficient energy consumption, a channel width with a least energy-per-byte, or a channel width with a longest transmission range.

10. The system of claim 8, wherein the optimization component further comprises a probing component that samples other channel widths to determine the optimum channel width.

11. The system of claim 6, wherein the control component obtains the at least one desired optimization objective from at least one of: a policy, a user, an application, or a higher-layer protocol.

12. The system of claim 6, wherein:
   if the current average data rate is below the first threshold value, the channel width is adjusted from the specified width to an adjacent narrower channel width of a set of known channel widths;
   if the current average data rate is above the second threshold value, the channel width is adjusted from the specified width to an adjacent wider channel width of the set of known channel widths; and
   if the current average data rate is between the first threshold value and the second threshold value or if the current average data rate is equal to the first threshold value or the second threshold value, the channel width is adjusted according to the highest measured throughput or the highest measured energy efficiency of the channel based on at least one of the attribute or the desired optimization objective.

13. A method comprising:
transmitting one or more symbols in a wireless signal via a channel having a specified width;
determining at least one value for at least one characteristic of at least one of the wireless signal, or a wireless signal transmitter;
obtaining at least one optimization objective; and
adjusting the channel width based at least in part on:
  determining a parameter pair that includes a first threshold value and a second threshold value, the first threshold value and the second threshold value comprising average data rates corresponding to a maximum data throughput efficiency of the channel, the determining the parameter pair being based at least in part on a number of probing intervals between probes of the channel;
  determining a current average data rate for the channel at the specified width;
  determining a relationship between the current average data rate and the parameter pair, the channel width being adjusted based at least in part on the relationship and at least one of the characteristic or the optimization objective.

14. The method of claim 13, wherein at least one of the characteristic or the optimization objective includes at least one of energy consumption, data rate, loss rate, interference, link condition, signal-to-noise ratio (SNR), signal strength, throughput, transmission range, or capacity.

15. The method of claim 13, further comprising determining an optimum channel width for the wireless signal transmitter based at least in part on at least one of the characteristic or the optimization objective,
wherein the optimum channel width is at least one of: a channel width having a greatest throughput, a channel width having a most efficient energy consumption, a channel width having a least energy per byte, or a channel width having a longest transmission range.

16. The method of claim 15, further comprising sampling other channel widths to determine the optimum channel width.

17. The method of claim 13, further comprising implementing adaptive channel width control using wireless transmitters by at least one of: maintaining one or more rate tables that are loaded by a device driver of the wireless signal transmitter, modifying a slot time to be the same across all channel widths, or adjusting a computation for packet durations according to different channel widths.

18. The method of claim 13, further comprising splitting the channel having a first bandwidth hosting multiple conversations into a plurality of channels having a bandwidth that is narrower than the first bandwidth, wherein there is one or more conversations per channel.

19. The method of claim 13, further comprising maintaining a data rate supported by the channel width when the channel width of the wireless signal transmitter is adjusted.

20. The method of claim 13, wherein the optimization objective is obtained from at least one of: a policy, a user, an application, or a higher-layer protocol.

21. The method of claim 13, further comprising selecting the narrowest available channel width when there is no data to transmit.

22. A method comprising:
transmitting a wireless signal by a wireless transmitter via a channel having a specified channel width;
determining at least one characteristic of at least one of the wireless signal, or the wireless transmitter, the characteristic including at least one of energy consumption, data rate, loss rate, interference, link condition, signal-to-noise ratio (SNR), or signal strength;
acquiring at least one network objective from at least one of a policy, a user, an application, or a higher-layer protocol, the network objective including at least one of throughput, transmission range, capacity, or power consumption; and
adjusting the channel width based at least in part on:
  determining a parameter pair that includes a first threshold value and a second threshold value, the first threshold value and the second threshold value comprising average data rates corresponding to a maximum data throughput efficiency of the channel, the determining the parameter pair being based at least in part on a number of probing intervals between probes of the channel;
  determining a current average data rate for the channel at the specified channel width relative to the first threshold value and the second threshold value, wherein:
    if the current average data rate is below the first threshold value and the channel has not been probed within the number of probing intervals, the channel width is adjusted from the specified channel width to an adjacent narrower channel width of a set of predetermined channel widths;
    if the current average data rate is above the second threshold value and the channel has not been probed within the number of probing intervals, the channel width is adjusted from the specified channel width to an adjacent wider channel width of the set of predetermined channel widths; and
    if the current average data rate is between the first threshold value and the second threshold value or if the current average data rate is equal to the first threshold value or the second threshold value, the channel width is adjusted according to a highest measured throughput or a highest measured energy efficiency of the channel based on at least one of the characteristic or the network objective.

* * * * *